United States Patent
Murphy et al.

(10) Patent No.: US 7,206,856 B1
(45) Date of Patent: Apr. 17, 2007

(54) ROUTING INSTANCES FOR NETWORK SYSTEM MANAGEMENT AND CONTROL

(75) Inventors: James Murphy, San Ramon, CA (US); Sandhir Saurabh, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 644 days.

(21) Appl. No.: 10/063,358

(22) Filed: Apr. 15, 2002

(51) Int. Cl.
*G06F 15/173* (2006.01)
*H04L 12/28* (2006.01)

(52) U.S. Cl. ............... 709/238; 709/223; 709/227; 709/241; 709/242; 709/232

(58) Field of Classification Search ........ 709/223, 709/200–202, 227, 228–242; 370/351
See application file for complete search history.

(56) References Cited

U.S. PATENT DOCUMENTS

| | | | |
|---|---|---|---|
| 5,406,557 A * | 4/1995 | Baudoin | 370/407 |
| 5,491,801 A * | 2/1996 | Jain et al. | 709/241 |
| 6,003,064 A * | 12/1999 | Wicki et al. | 709/200 |
| 6,122,669 A * | 9/2000 | Crayford | 709/232 |
| 6,748,437 B1 * | 6/2004 | Mankude et al. | 709/227 |

* cited by examiner

*Primary Examiner*—Ario Etienne
*Assistant Examiner*—Sahera Halim
(74) *Attorney, Agent, or Firm*—Harrity Snyder, LLP

(57) ABSTRACT

A network system uses a management routing instance to route management information between elements involved in management of the system. The system registers each element in the management routing instance when the element comes on line. Based on the management routing instance, the system creates management forwarding tables. The system then uses the management forwarding tables to route management information between the elements. Multiple systems, for example systems connected by a network, may exchange management routing instance information to allow elements in different systems to communicate management information with each other.

29 Claims, 5 Drawing Sheets

ROUTING INSTANCES FOR NETWORK SYSTEM MANAGEMENT AND CONTROL

BACKGROUND OF INVENTION

The present invention relates to management of a system, and, more particularly, to facilitating exchange of management information among elements of a system or elements in different systems.

A conventional network system typically performs a particular function in a network. For example, a router routes packets in a network. The network system also performs management tasks that support that function. The management tasks are performed by certain elements within the system.

As part of performing the management tasks, the elements exchange management information with each other. For example, in a router, an element may monitor activities in the system. The monitoring may result in creation of management information that the element forwards to other elements in the system. The other elements may also create management information and forward it to one or more other elements in the system.

Communication of management information between elements is carried out in conventional systems using simple mechanisms that lack security and robustness. Moreover, conventional management information communication mechanisms require special purpose hardware and software dedicated to communicating the management information.

There is a need for management information communication mechanisms that allow elements of a system to communicate in a secure and robust manner, in a way that overcomes limitations of conventional management information communication mechanisms.

SUMMARY OF INVENTION

According to an embodiment of an apparatus consistent with the principles of the invention, management information transmitted from a source element is received by a routing element, which forwards the management information to a destination element based on management routing information. The management routing information may be a routing element, such as a management routing table or a management forwarding table.

According to an embodiment of a method consistent with the principles of the invention, management routing information is created and used for forwarding management information from a source element to a destination element based on management routing information. The management routing information may be a routing element, such as a management routing table or a management forwarding table.

According to other embodiments consistent with the principles of the invention, a source element in a first system transmits management information to a destination element in a second system. The management information transmitted from the source element is received by a forwarding element that forwards the management information to the destination element in the second system based on management routing information, such as a management routing table or a management forwarding table.

Further consistent with the principles of the invention, embodiments of the invention may be implemented using an industry standard protocol, such as the Internet protocol (IP), and use IP packets for transferring the management information. Moreover, embodiments consistent with the principles of the invention may also use similar routing and forwarding infrastructure as is used in routing and forwarding network traffic.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to embodiments consistent with the principles of the invention, examples of which are illustrated in the accompanying drawings. The same reference numbers may be used in different drawings to refer to the same or like parts.

According to embodiments consistent with the principles of the invention, elements that handle management tasks in a system use established routing infrastructure to transfer management information in the system. For example, the system may create a management routing instance that is used by the elements to route management information to one another. The elements may be registered in a routing table of the management routing instance. In one embodiment, the elements use the Internet protocol (IP) and IP packets to route management information to each other.

Figure 1:
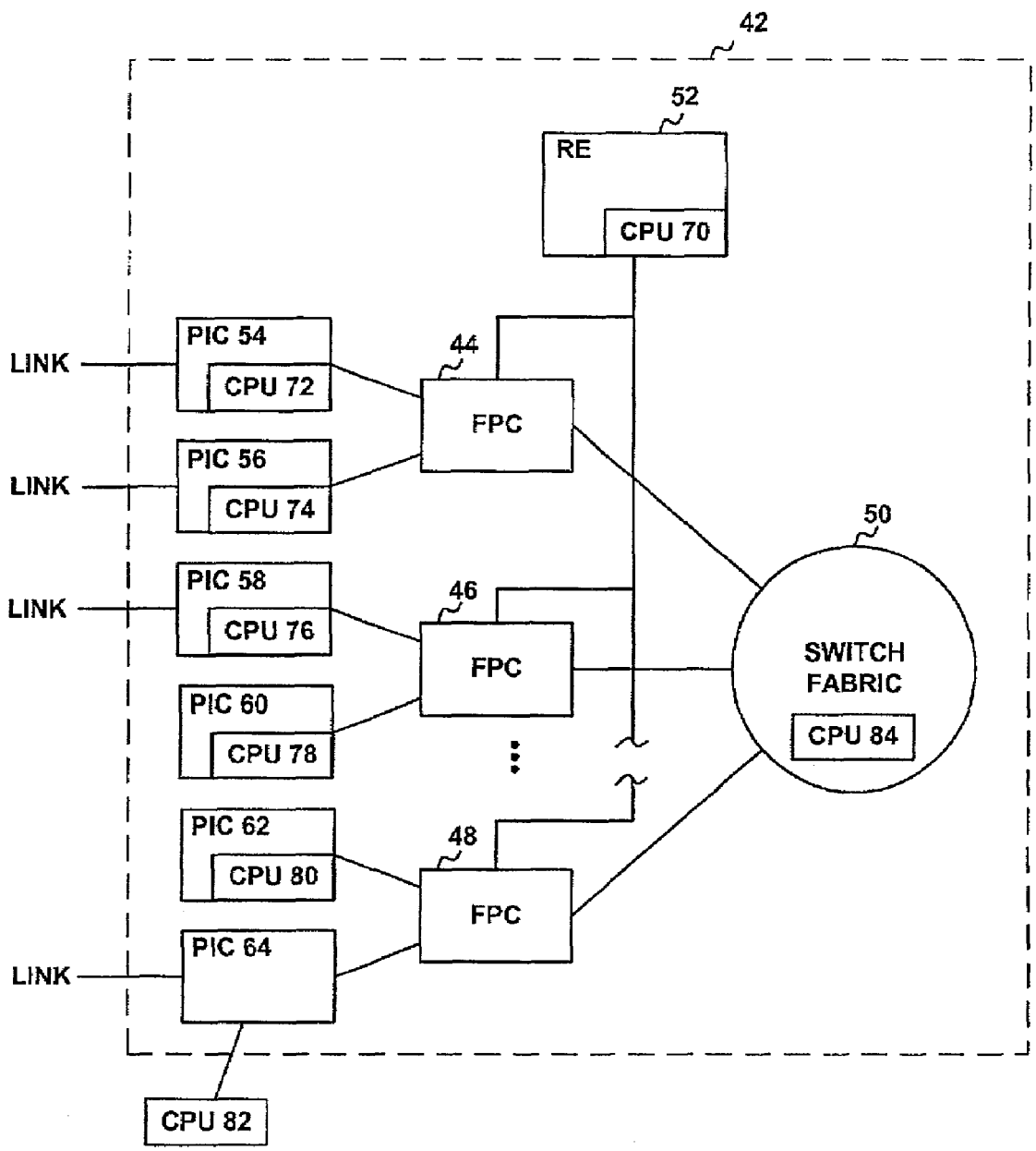
FIG. 1 is a block diagram illustrating a system 42 consistent with the principles of the invention.

FIG. 1 is a block diagram illustrating a system 42 consistent with the principles of the invention. In the embodiment shown, system 42 acts as a router. System 42 comprises flexible physical interface card (PIC) concentrators (FPCs) 44, 46 . . . 48, a switch fabric 50, a routing engine (RE) 52, PICs 54–64, and central processing units (CPUs) 70–80 and 84. CPU 82 is located external to system 42 and is connected to PIC 64. System 42 receives network traffic, such as packets, from a physical link, processes the packets to determine destination information for each packet, and forwards the packets out on one or more links based on the destination information.

PICs 54–58 and 64 are each connected to a network link. Each link may be connected to another system or a network and may be one of many types of transport media, such as optical fiber or Ethernet cable. The data on the link is formatted according to one of several protocols, such as the synchronous optical network (SONET) standard, or Ethernet. For example, PICs 54–58 and 64 may forward The packets from the links to one of FPCs 44–48. FPCs 44–48 are each connected to RE 52, switch fabric 50, and PICs 54–64. FPCs 44–48 may use network forwarding tables to determine the destination of each packet, and transmit the packet to the PIC connected to the destination link.

Network packets received on the links from other network systems may be destined for RE 52. For example, network systems need to communicate network topology information and other types of network-related information to each other.

System 42, as part of processing incoming and outgoing network traffic, needs to perform management tasks to coordinate the traffic processing and general functioning of system 42. In one embodiment consistent with the principles of the invention, system 42 transfers management information in the system using routing infrastructure that is similar to the routing infrastructure the system uses for network traffic processing.

System Management

Elements in system 42 manage certain areas and tasks in system 42, and may exchange management information with each other as part of performing those management tasks. For example, an element in system 42 may monitor a part of system 42 and report the monitoring results to one or more other elements. Elements may also perform other management tasks, such as management tasks that support network traffic processing in system 42.

In the embodiment illustrated in FIG. 1, elements involved in management of system 42 are illustrated as CPUs 70–84. CPUs 70–80 and 84 are located in RE 52, switch fabric 50, and PICS 54–58 and 64. CPU 82 is connected to PIC 64. Each of CPUs 70–84 may perform various tasks in managing system 42. For example, CPUs 70–84 may collect information and monitor conditions in particular areas of system 42. CPUs 70–84 may also perform non-management tasks for system 42 in addition to their management tasks. Although the elements illustrated in FIG. 1 are CPUs, in other embodiments consistent with the principles of the invention the elements may comprise any type of element involved in management of system 42.

CPUs 72–84 are located in various parts of system 42, and perform a variety of functions. CPUs 72–76 are located on PICs 54–58, respectively. Each of PICs 54–58 are connected to a link and perform operations that may include transfer of data over a link. CPUs 72–76 may perform network traffic tasks for incoming and outgoing network traffic, in addition to management tasks related to management of system 42.

CPUs 78 and 80 are located on PICs 60 and 62, respectively. PICs 60 and 62 are service PICs, which are not connected to a link. Service PICs 60 and 62 perform special-purpose tasks in system 42. For example, service PIC 60 may set up, manage, and tear down tunnels for network traffic. CPUs 78 and 80 may take part in performing the special-purpose tasks.

CPUs 78 and 80 may also perform management tasks for system 42 and send to other elements management information related to the special-purpose tasks or the management tasks. For example, service PIC 60 may send management information regarding the tunnels to other elements in system 42. Service PIC 60 may also exchange management information with another element, such as service PIC 62. For example, service PIC 62 may handle tunnel support tasks, such as maintaining context for each tunnel.

CPU 82 is connected to PIC 64, and is located external to system 42. CPU 82 may be connected to other elements and may perform tasks related to the network traffic processing of system 42, as well as management tasks.

CPU 84 is located in switch fabric 50 and may perform switch fabric processing and management processing related to switch fabric 50. For example, CPU 84 may assist in transferring network traffic between FPCs 44–48 and switch fabric 50 and assist in transferring network traffic through switch fabric 50. CPU 84 may also perform management tasks for system 42, such as monitoring network traffic in switch fabric 50 or collecting switch fabric data.

CPU 70 is located in RE 52. CPU 70 may perform tasks that directly support RE 52, as well as management tasks for system 42.

To coordinate management tasks, CPUs 70–84 may exchange management information with each other. Management information is transferred between CPUs 70–84 using packets. For example, CPUs 72–84 may communicate packets to CPU 70 of RE 52 as part of the management of system 42, such as by sending management information to CPU 70 that requests modification of network routing instances used by system 42 when routing network traffic. Service PIC 60, may request CPU 70 to modify a particular network routing instance that is affected by changes in the tunnels managed by service PIC 60. CPU 78 on PIC 60 may send the request in the form of management information in one or more packets to FPC 46, destined for CPU 70 on RE 52. FPC 46 looks up the destination of each packet in a management forwarding table, determines that each packet is destined for CPU 70, and forwards the packets to CPU 70. CPU 70 receives the packets, extracts the management information, and responds to the management information accordingly.

In order to forward management information to the appropriate destination, each of FPCs 44–48 must be properly configured with management routing information that allows it to determine where to send the management information. In one embodiment, RE 52 is responsible for configuring FPCs 44–48.

RE 52 maintains a management routing instance that defines characteristics of CPUs 72–84. A routing instance is a software object that defines a group of entities, in this case management-related elements, that may communicate with each other. Whenever a management-related element comes on line in system 42, RE 52 registers the element in the management routing instance. The routing instance created by RE 52 includes a routing table that defines the logical interfaces that identify the management-related elements registered in the routing instance. RE 52 creates forwarding tables based on the routing instance, and forwards them to FPCs 44–48 to configure them.

RE 52 may perform a variety of routing instance operations, such as creating, altering, and killing a routing instance. RE 52 makes itself a member of each routing instance so it can exchange information with other members of a particular routing instance.

RE 52 creates management forwarding tables based on the management routing instance, and configures each of FPCs 44–48 with a management forwarding table. FPCs 44–48 use the management forwarding table to determine how management information from CPUs 70–84 should be forwarded to destinations specified by the management information.

In one embodiment consistent with the principles of the invention, the Internet protocol (IP) and IP packets are used for transferring management information among CPUs 70–84. In this embodiment, when FPC 44 receives a management information in packet from CPU 72, it first analyzes the layer 2 (L2) information in the packet. The L2 information includes the source address, in this case address of CPU 72. In one embodiment, the address is a logical interface identifier of CPU 72. In other embodiments, other layers of a protocol may also be used. FPC 44, upon receiving the packet, uses the logical interface identifier to determine which forwarding table to use to determine the destination of the packet. FPC 44 then determines from the forwarding table the physical interface of the destination CPU, in this case CPU 80, based on the logical interface information in the forwarding table. FPC 44 then forwards the packet(s) to CPU 80 based on the physical interface information.

CPU 70 may register the logical interfaces for CPUs 70–80 and 84 in the management routing instance in a variety of ways. Logical interfaces may be registered automatically, without human intervention. For example, at the time one of CPUs 70–84 comes on line, it may send a message to RE 52 indicating that it has come on line. RE 52 will register the new element in the appropriate management routing instances. Instead of automatic registration, a user may manually register logical interfaces in one or more management routing instances. For example, an administrator of system 42 may use a command line interface or some other configuration mechanism (not shown) to enter the logical interfaces for one or more of CPUs 70–80 and 84 in the management routing instance.

CPUs 70–84 may also use the management routing instance to send heartbeat messages to each other. For example, in the embodiment of FIG. 1, CPUs 70–84 periodically send heartbeat messages to other elements registered in a management routing instance. Heartbeat messages may serve several purposes. For example, if a CPU tracks heartbeat messages from other CPUs, it can determine when another CPU goes down. CPUs 70–84 can also use heartbeat messages for determining when a CPU has been registered with the management routing instance.

CPUs 70–84 may use heartbeat messages to perform management tasks. For example, if one of CPUs 70–84 is designated as a master CPU, it can track the other CPUs in system 42 and allocate work accordingly. If one CPU goes down, another CPU can be allocated the tasks of the CPU that went down. In one embodiment, one CPU is designated a master. The master CPU reallocates tasks from one CPU to another CPU. The master CPU may monitor heartbeat messages and upon detecting a down CPU, allocate the tasks of the down CPU to live CPUs. Other tasks may also be carried out based on the heartbeat messages.

In embodiments consistent with the principles of the invention, system 42 may use the existing routing infrastructure of system 42, i.e., the routing infrastructure that is used for routing network traffic, for routing management information between CPUs 70–84. Using the existing routing infrastructure of system 42 leverages hardware, software, and firmware routing functionality already available in system 42 for routing network traffic. The routing infrastructure includes, for example, routing instances, routing protocols, and standard sockets application programming interfaces (APIs), and other routing infrastructure features. Using management routing instances also provides security among the elements because only elements that are part of a management routing instance can transfer management information to each other.

Routing Instance Embodiment

Figure 2:
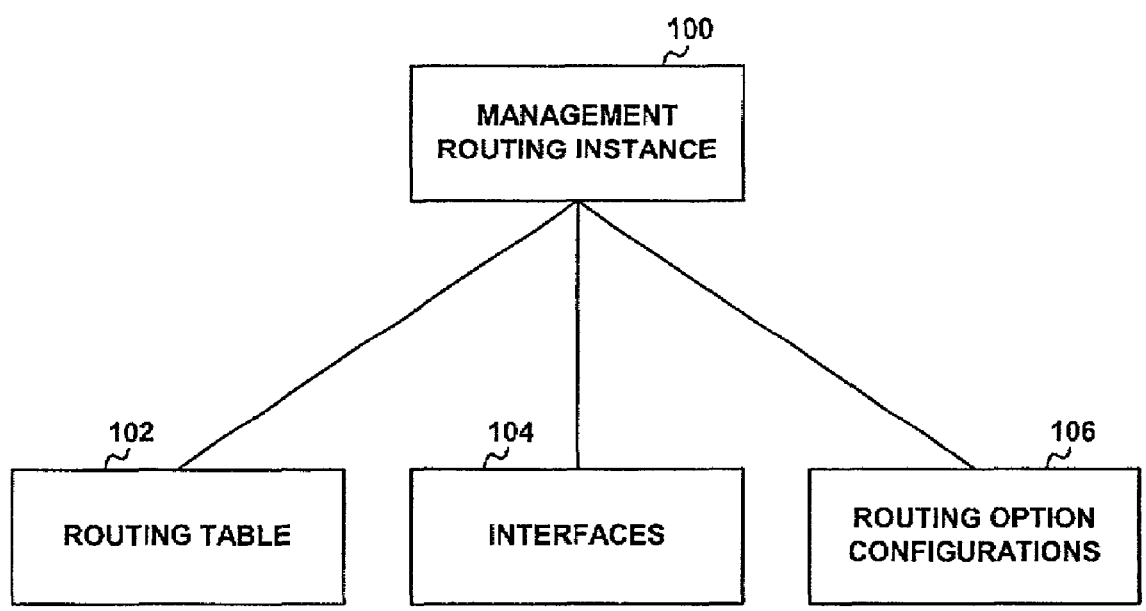
FIG. 2 illustrates an example embodiment of a management routing instance consistent with the principles of the invention.

FIG. 2 illustrates an example embodiment of a management routing instance consistent with the principles of the invention. In this embodiment, a management routing instance 100 comprises a routing table 102, a list of interfaces 104, and a set of routing option configurations 106. Routing table 102 maps addresses to logical interfaces. In one embodiment consistent with the principles of the invention, routing table 102 comprises addresses mapped to L2 information, such as an L2 header and a logical interface identifier.

In the embodiment illustrated in FIG. 1, RE 52 is responsible for creating and maintaining management routing instances in system 42. In other embodiments consistent with the principles of the invention, routing instances may be created and maintained by one or more other elements in system 42. For example, any element in system 42, whether directly involved with management or not, may create and maintain routing instances in system 42. Routing instances may also be created and maintained in a distributed fashion in system 42 by multiple elements in the system.

Routing Instance Management

Figure 3:
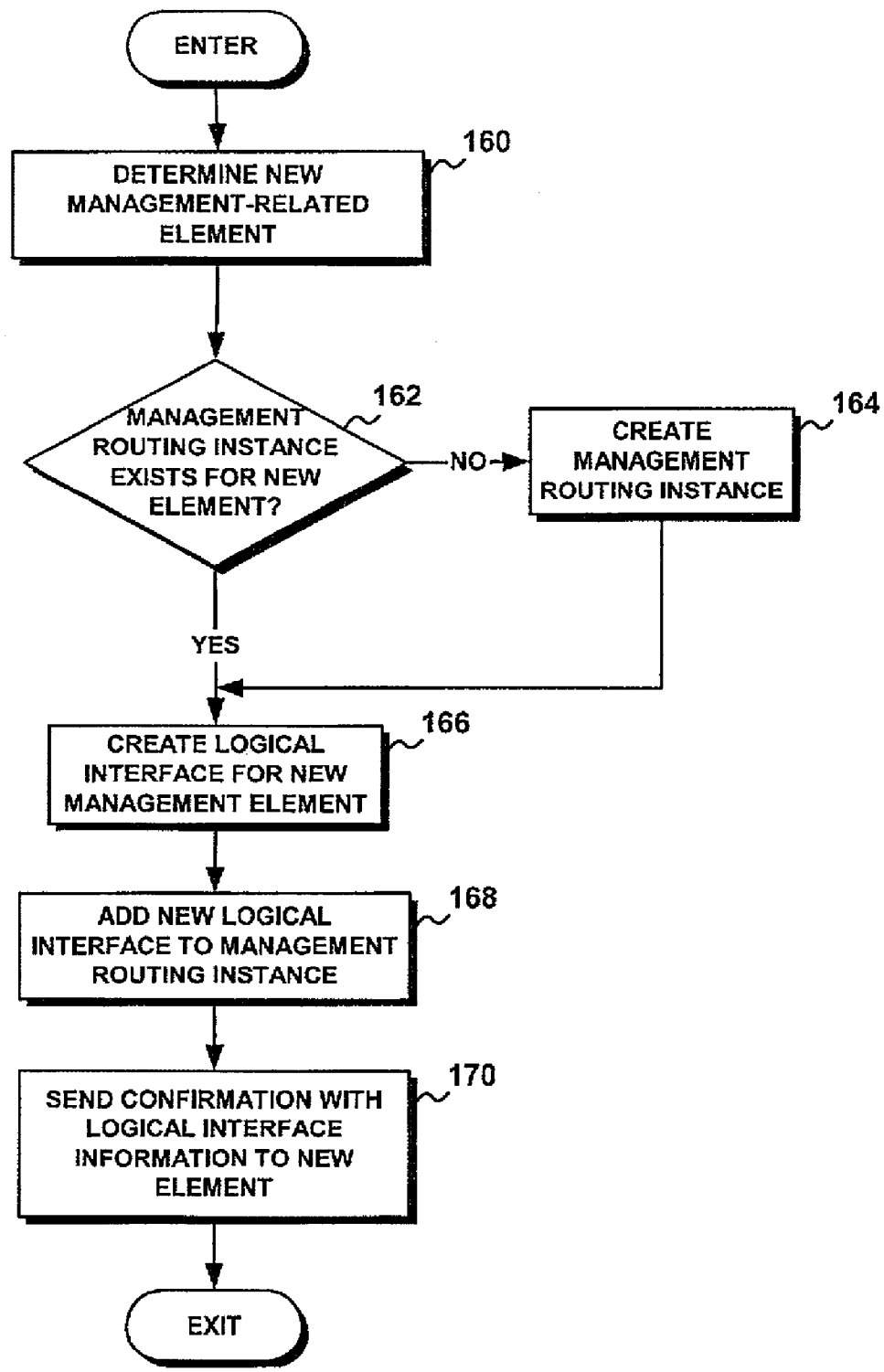
FIG. 3 is a flowchart illustrating an example of a process that may be performed by RE 52 in creating and managing a management routing instance, consistent with the principles of the invention.

FIG. 3 is a flowchart illustrating an example of a process that may be performed by RE 52 in creating and managing a routing instance, consistent with the principles of the invention. When an element comes on line in system 42, it sends a new element indicator to RE 52. The new element indicator may be in the form of any type of signal or other communication between the element and RE 52.

Upon receiving the new element indicator, RE 52 determines what type of element it is. For example, RE 52 may determine element type from the received new element indicator or by communicating directly with the new element. Based on the element type, RE 52 notifies other elements and processes. If the new element needs to be part of one or more management routing instances, RE 52 registers the new element in the appropriate management routing instances.

In response to determining that the new element is a management element (act 160) RE 52 determines whether to register the new element in an existing management routing instance, or to create a new management routing instance (act 162). If a management routing instance already exists, RE 52 proceeds directly to creating a logical interface for the new element (act 166). If a management routing instance does not already exist, RE 52 creates a management routing instance (act 164). RE 52 creates a logical interface for the new element (act 166). RE 52 then adds the new logical interface to the management routing instance (act 168), and sends confirmation to the new element (act 170). The confirmation may include information the element needs in order to communicate management information based on the management routing instance. The process repeats when RE 52 receives another indication of a new management-related element (act 160).

For example, when CPU 72 on PIC 54 comes on line, it sends a new element indicator to RE 52. If RE 52 has not created a management routing instance for communicating management information, it creates a management routing instance. RE 52 then creates a logical interface for CPU 72 and adds CPU 72 to the routing table in the management routing instance. As additional elements come on line, they also send a new element indicator to RE 52 and RE 52 registers them in the management routing instance.

RE 52 may create multiple management routing instances. In some systems, a single management routing instance may be all that is needed for the elements exchanging management information. Multiple management routing instances may also be used, however, and each element may be registered as a logical interface in one or more management routing instances. RE 52 may modify management routing instances, or tear down management routing instances that are no longer needed.

Figure 4:
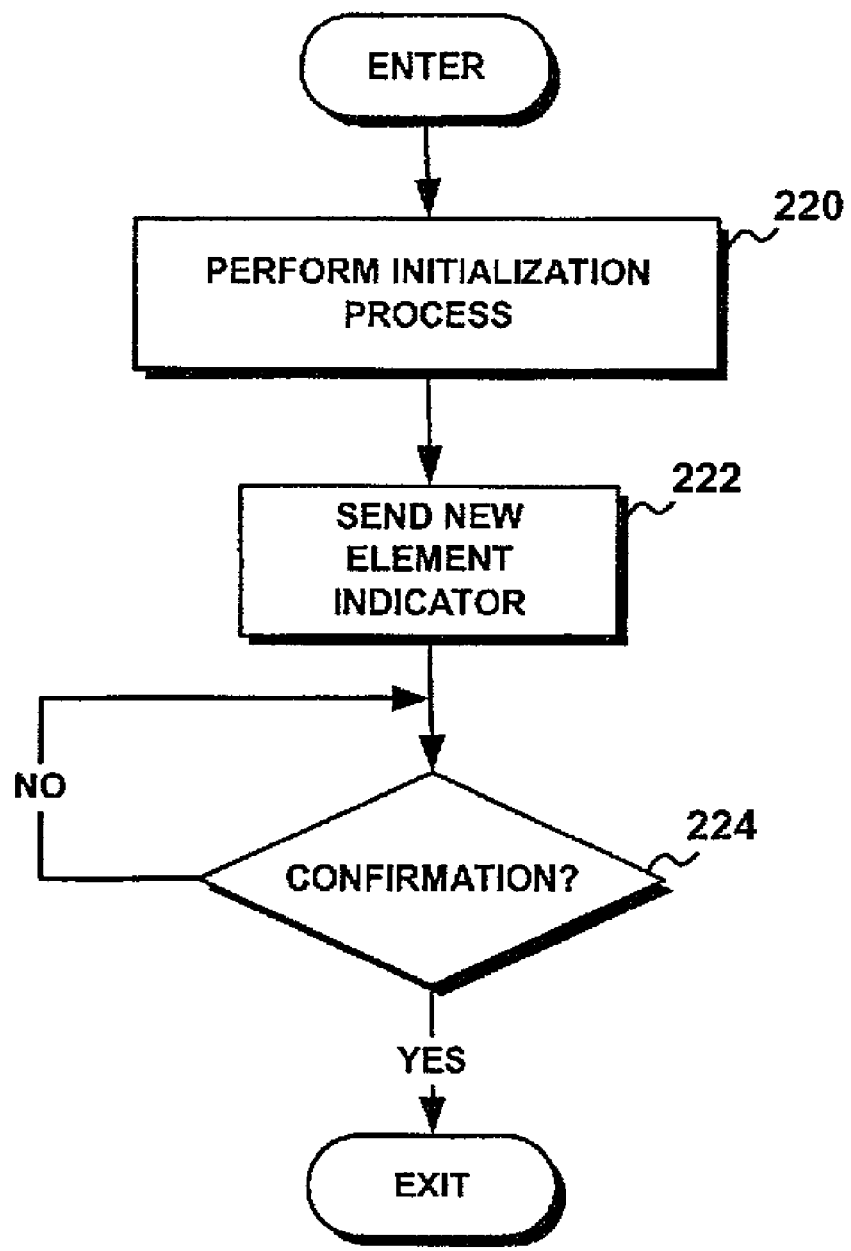
FIG. 4 is a flowchart illustrating an example of a process that may be performed by an element coming on line, consistent with the principles of the invention.

FIG. 4 is a flowchart illustrating an example of a process that may be performed by an element coming on line, consistent with the principles of the invention. CPU 78 will be used as an example. When PIC 60 comes on line, CPU 78 first performs an initialization process (act 220). This may include, for example, determining its internal IP address from the slot and port associated with PIC 60. After the initialization process, CPU 72 sends a new element indicator to RE 52 (act 222), and waits for confirmation (act 224). Upon receiving confirmation from RE 52, CPU 72 begins carrying out its tasks. The process may include additional communications between a new element and RE 52.

Processing Network Traffic

The management tasks support system 42 as it receives and transmits network traffic. System 42 generally receives and transmits two types of network traffic: 1) network data flowing between sources and destinations, and 2) network information exchanged by systems in the network to facilitate network traffic flow between systems. Network traffic comes in on the network links connected to PICs 54–58 and 64, and goes out on the network links. System 42 must process the incoming network traffic to determine which particular PIC the network traffic should go out on.

Processing incoming network traffic requires proper configuration of system 42 so that the traffic is properly forwarded toward its destination. In the embodiment illustrated in FIG. 1, system 42 may be configured by RE 52.

In one embodiment consistent with the principles of the invention, processing network traffic may use the same routing infrastructure used by system 42 to configure system 42 and transfer management information. To configure system 42 for processing network traffic, RE 52 first collects information regarding network characteristics of the network and characteristics of system 42. RE 52 collects information regarding characteristics of the network from network information received from other systems in the network. The network information may, for example, provide information regarding network characteristics, such as topology or path characteristics between entities in the network. RE 52 may also forward this type of network information to other systems in the network. The other systems use the network information in a similar manner—to configure that system so it interacts correctly with other systems in the network. RE 52 collects characteristics of system 42 by tracking which elements are on line that may be involved in processing incoming and outgoing network traffic.

Using the information regarding characteristics of the network and characteristics of system 42, RE 52 creates network routing instances that define groups of network entities that may communicate with each other. The network routing instances are similar to management routing instances, but are used by system 42 to route network traffic rather than management information.

RE 52 creates a routing instance for network systems that communicate with each other. Like the management routing instances, each network routing instance may include a routing table having information identifying the network systems. RE 52 uses the routing instances to create network forwarding tables. Basically, the network forwarding tables associate network destinations with particular PICs in system 42. For example, a network forwarding table might associate destination A in the network with PIC 56 because the link connected to PIC 56 is determined by RE 52 to be connected to a system on a potential path to destination A.

RE 52 forwards the network forwarding tables to FPCs 44, 46, and 48, which use the tables to forward network traffic through system 42. More particularly, FPCs 44–48 receive network traffic from PICs 54–58 and 64, determine destination information from the network traffic, and use the network forwarding tables to determine, based on the destination information, which of PICs 54–58 and 64 the network traffic should be sent out on. Thus, system 42 forwards network traffic using network forwarding tables created from network routing instances.

The other type of information received by system 42 from other network systems, network information, also comes into system 42 on one or more of PICs 54–58 and 64, and, like the network traffic, is forwarded by the PICs to FPCs 44–48. For network information, however, FPCs 44–48 forward the information to RE 52. Network information includes information that is used by systems in the network to coordinate transfer of network traffic. Network information might, for example, include network topology information, such as link state characteristics.

In other embodiments consistent with the invention, network forwarding tables are not necessary because network routing tables may be used directly to forward packets through system 42.

System to System Management Information Communication

Figure 5:
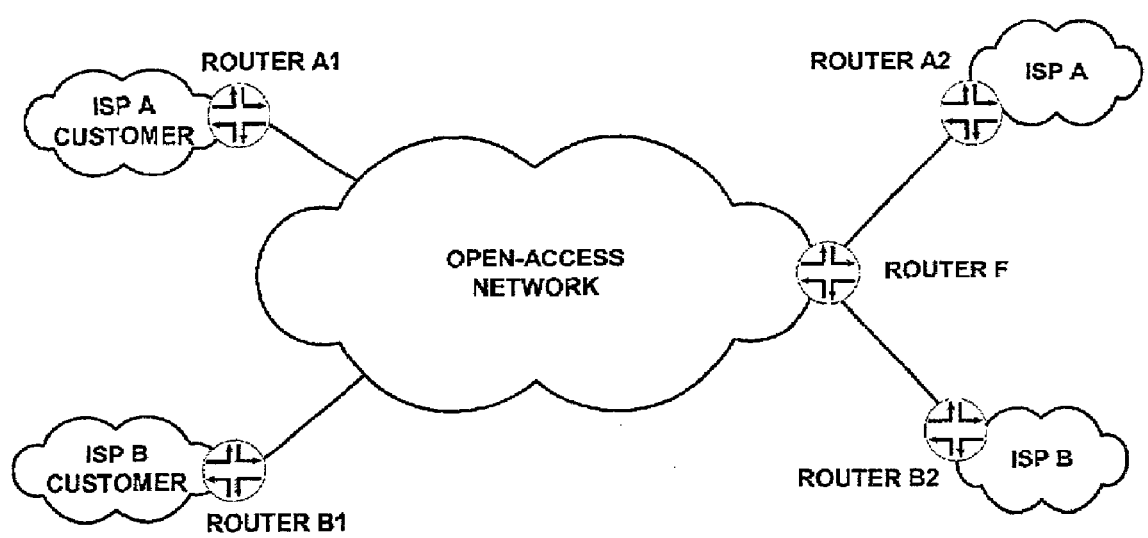
FIG. 5 shows an example of a network topology using management routing instances that allows elements on different routers to communicate management information to each other, consistent with the principles of the invention.

FIG. 5 shows an example of a network topology using management routing instances so elements on different routers can communicate management information to each other, consistent with the principles of the invention. In the example shown, two ISPs are represented: ISP A and ISP B. ISP A customer and ISP B customer are customers of ISPs A and B, respectively. Each ISP customer accesses its respective ISP's network and may do so through an open-access network. Router F links the open-access network to routers in each ISP's network.

In one embodiment, elements in one router are registered in the management routing instance of one or more other routers in the network. This allows elements in different routers to communicate management information with each other. In FIG. 5, for example, ISP A uses routers A1 and A2 as gateways. Routers A1 and A2 may be configured as shown and described in FIGS. 1–4. To allow elements of router A1 to exchange management information with elements in router A2 as part of the management of routers A1 and A2 of ISP A, the RE of router A1 sends information to the RE of router A2 that defines one or more elements in router A1 that are members of the A1 management routing instance. The RE of router A2 uses this information to register the elements of router A1 in the A2 management routing instance. Similarly, the RE of router A2 sends information to the RE of router A1 that defines one or more elements that are members of the A2 management routing instance. The RE of router A1 uses this information to register the elements of router A2 in the A1 management routing instance.

Exchanging management routing instance information between REs on different routers may be carried out by any suitable communication exchange mechanism. In one embodiment, REs exchange management routing instance information using a routing protocol.

Each RE then creates forwarding tables based on the management routing instances, which are forwarded to the FPCs in each router. Management information may then be transmitted between elements on routers A1 and A2 using known network data transfer mechanisms, such as secure tunnels. Thus, elements in different routers may transmit management information to one another using management routing instances that include elements in different routers.

Other embodiments of the invention will be apparent to those skilled in the art from consideration of the specification and practice of the invention disclosed herein. For example, while the invention has been described in connection with a router, the invention may also be used in a switch or other system in which elements exchange management information. The invention may also be used in systems that do not use forwarding tables. In some systems, routing may be determined directly from information in the routing table, without using forwarding tables. It is intended that the specification and examples be considered as exemplary only, with a true scope and spirit of the invention being indicated by the following claims.

The invention claimed is:

1. A method of communicating management information within a router, comprising:
creating management routing information;
transmitting data including management information;
forwarding the management information from a first element to a second element within the router based on the data and the management routing information; and
forwarding network traffic within the router based on network traffic routing information.

2. The method of claim 1, wherein the creating management routing information includes:
creating a management routing table.

3. The method of claim 1, wherein the creating management routing information includes:
creating a management forwarding table.

4. The method of claim 1, wherein the transmitting data includes:
transmitting a packet.

5. The method of claim 1, wherein the forwarding includes:
transmitting a packet.

6. The method of claim 1, further comprising:
forwarding management information to a third element external to the router.

7. The method of claim 6, wherein the forwarding management information to a third element external to the router includes:
forwarding the management information over a network to an element in another router.

8. The method of claim 1, wherein the router includes a plurality of elements; and
wherein the method further comprises:
creating a plurality of management routing instances, where each of the management routing instances defines a group of the elements within the router that are capable of communicating with each other; and
registering each of the elements to one or more of the management routing instances.

9. A router, comprising:
a routing element configured to create management routing information;
a source element, within the router, configured to send data that includes management information;
a forwarding element configured to
receive the data and forward the management information based on the data and the management routing information; and
forward network traffic based on network traffic routing information; and
a destination element, within the router, configured to receive the management information from the forwarding element.

10. The router of claim 9, wherein the management routing information includes a management routing table.

11. The router of claim 9, wherein the management routing information includes a management forwarding table.

12. The router of claim 9, wherein the forwarding element includes:
a packet transmitting element configured to transmit a packet.

13. The router of claim 9, wherein the destination element receives the management information over a local bus.

14. The router of claim 9, wherein the forwarding element is further configured to send management information over a network to an element located within another router.

15. The router of claim 9, wherein the routing element is configured to:
create a plurality of management routing instances, where each of the management routing instances defines a group of elements within the router that are capable of communicating with each other, and
register each of the source and destination elements to one or more of the management routing instances.

16. The router of claim 9, wherein the source element includes a source processing unit and the destination element includes a destination processing unit; and
wherein the forwarding element is configured to forward the management information from the source processing unit to the destination processing unit.

17. A method of transmitting management information from a first element to a second element within a router, comprising:
creating a management routing instance that includes information regarding the first element and information regarding the second element, where the first element, within the router, transmits management information to the second element, within the router;
transmitting the management information as a management information packet from the first element;
forwarding the management information packet based on management routing information and the management routing instance;
receiving the management information packet at the second element; and
forwarding network traffic from the first element to the second element based on network traffic routing information.

18. The method of claim 17, wherein the transmitting the management information packet includes:
transmitting a packet having a format defined by a first protocol.

19. The method of claim 17, wherein the forwarding the management information packet includes:
transmitting information having a format defined by a network transmission protocol.

20. The method of claim 17, wherein the forwarding network traffic includes:
transmitting information having a format defined by the network transmission protocol.

21. The method of claim 17, wherein the forwarding the management information packet includes:
analyzing the management routing information by a forwarding element.

22. The method of claim 17, wherein the management information packet and network traffic both use the Internet protocol.

23. A management system for transmitting management information from a first element to a second element within a router, comprising:

a management routing instance that includes information regarding the first element and information regarding the second element, where the first element, within the router, transmits management information to the second element, within the router;

the first being configured to transmit the management information as a management information packet;

a forwarding element configured to forward the management information packet based on management routing information and the management routing instance;

the second element being configured to receive the management information packet; and network traffic elements configured to forward network traffic from the first element to the second element based on network traffic routing information.

24. The management system of claim 23, wherein the first element includes:

a packet element configured to transmit a packet having a format defined by a first protocol.

25. The management system of claim 23, wherein the first element includes:

a management transmitting element configured to transmit information having a format defined by a network transmission protocol.

26. The management system of claim 25, wherein the network traffic elements include:

a network traffic transmission element configured to transmit information having a format defined by the network transmission protocol.

27. The management system of claim 23, wherein the forwarding element includes:

an analyzing element configured to analyze the management routing information.

28. The management system of claim 23, wherein the management information packet and network traffic both use the Internet protocol.

29. The method of claim 1, wherein the first element includes a first processing unit and the second element includes a second processing unit; and wherein forwarding the management information from a first element to a second element includes forwarding the management information from the first processing unit to the second processing unit.

* * * * *

UNITED STATES PATENT AND TRADEMARK OFFICE
CERTIFICATE OF CORRECTION

| | | |
|---|---|---|
| PATENT NO. | : 7,206,856 B1 | Page 1 of 1 |
| APPLICATION NO. | : 10/063358 | |
| DATED | : April 17, 2007 | |
| INVENTOR(S) | : James Murphy et al. | |

It is certified that error appears in the above-identified patent and that said Letters Patent is hereby corrected as shown below:

Col. 11, claim 23, line 9, insert the word --element-- after "first" and before "being".

Signed and Sealed this

Fourteenth Day of August, 2007

JON W. DUDAS
*Director of the United States Patent and Trademark Office*